(12) United States Patent
Wu et al.

(10) Patent No.: US 8,277,934 B2
(45) Date of Patent: *Oct. 2, 2012

(54) COATING SYSTEM FOR CEMENT COMPOSITE ARTICLES

(75) Inventors: Shaobing Wu, Jamestown, NC (US); T. Howard Killilea, North Oaks, MN (US); Glen Otto Vetter, New Hope, MN (US); Frank Bor-Her Chen, Greensboro, NC (US); James M. Bohannon, High Point, NC (US)

(73) Assignee: Valspar Sourcing, Inc., Minneapolis, MN (US)

( * ) Notice: Subject to any disclaimer, the term of this patent is extended or adjusted under 35 U.S.C. 154(b) by 1463 days.

This patent is subject to a terminal disclaimer.

(21) Appl. No.: 11/669,134

(22) Filed: Jan. 30, 2007

(65) Prior Publication Data

US 2007/0259188 A1    Nov. 8, 2007

Related U.S. Application Data

(60) Provisional application No. 60/764,103, filed on Jan. 31, 2006.

(51) Int. Cl.
*B32B 13/02* (2006.01)
*B32B 27/40* (2006.01)
*C08F 2/48* (2006.01)

(52) U.S. Cl. .................. 428/294.7; 428/423.1; 428/489; 428/500; 428/688; 427/496; 427/407.1; 427/417

(58) Field of Classification Search ............... 428/423.1, 428/489, 500, 688, 294.7; 427/496, 407.1, 427/417
See application file for complete search history.

(56) References Cited

U.S. PATENT DOCUMENTS

| | | | |
|---|---|---|---|
| 2,128,961 | A | 9/1938 | Patterson |
| 2,356,542 | A | 8/1944 | Sloan |
| 2,633,458 | A | 3/1953 | Shokal |
| 2,674,775 | A | 4/1954 | Willson |
| 2,727,012 | A | 12/1955 | Treat et al. |
| 2,730,517 | A | 1/1956 | Vogel et al. |
| 3,010,919 | A | 11/1961 | MacKinney et al. |
| 3,049,458 | A | 8/1962 | Willard |
| 3,091,551 | A | 5/1963 | Robertson |
| 3,219,467 | A | 11/1965 | Redican et al. |

(Continued)

FOREIGN PATENT DOCUMENTS

AU          198060655 A1    3/1981

(Continued)

OTHER PUBLICATIONS

Dow® Z-6018 Intermediate Product Information, "Silicone Intermediates", 3 pgs., (Aug. 28, 2006).

(Continued)

*Primary Examiner* — Thao T. Tran
(74) *Attorney, Agent, or Firm* — IPLM Group, P.A.

(57) ABSTRACT

A coated article which includes a cement fiberboard substrate and a radiation-curable coating system applied to the substrate. The coating system includes an aqueous dispersion of water-dispersible polymer particles, one or more olefinic compounds and water, and may be provided in the form of one or more coating compositions that may be applied in one or more layers, wherein each of the coating compositions is preferably an aqueous composition, or can be mixed with another composition (e.g., on the substrate) to form an aqueous composition.

30 Claims, 1 Drawing Sheet

U.S. PATENT DOCUMENTS

| | | | |
|---|---|---|---|
| 3,380,831 A | 4/1968 | Cohen et al. |
| 3,449,161 A | 6/1969 | Hindersinn et al. |
| 3,655,423 A | 4/1972 | Lin et al. |
| 3,781,396 A | 12/1973 | Okuda et al. |
| 3,899,611 A | 8/1975 | Hall |
| 3,935,173 A | 1/1976 | Ogasawara et al. |
| 3,935,364 A | 1/1976 | Prokesh et al. |
| 3,952,032 A | 4/1976 | Vrancken et al. |
| 3,970,628 A | 7/1976 | Connelly et al. |
| 3,991,136 A | 11/1976 | Dalton et al. |
| 4,015,040 A | 3/1977 | Hoshida et al. |
| 4,028,294 A | 6/1977 | Brown et al. |
| 4,113,893 A | 9/1978 | Hahn |
| 4,132,526 A | 1/1979 | Schwarz et al. |
| 4,197,389 A | 4/1980 | Becker et al. |
| 4,211,848 A | 7/1980 | Blount |
| 4,228,761 A | 10/1980 | Glover et al. |
| 4,324,822 A | 4/1982 | Kobayashi et al. |
| 4,333,867 A | 6/1982 | Sauntson |
| 4,385,152 A | 5/1983 | Boyack et al. |
| 4,390,688 A | 6/1983 | Walz et al. |
| 4,408,018 A | 10/1983 | Bartman et al. |
| 4,486,553 A | 12/1984 | Wesch |
| 4,522,962 A | 6/1985 | Abbey et al. |
| 4,528,307 A | 7/1985 | Fuhr et al. |
| 4,536,534 A | 8/1985 | Singer et al. |
| 4,582,755 A | 4/1986 | Dietrich |
| 4,598,108 A | 7/1986 | Hoefs |
| 4,719,149 A | 1/1988 | Aasen et al. |
| 4,737,577 A | 4/1988 | Brown |
| 4,742,121 A | 5/1988 | Toman |
| 4,782,109 A | 11/1988 | DuLaney et al. |
| 4,822,828 A * | 4/1989 | Swofford ............. 522/84 |
| 4,822,858 A | 4/1989 | Pivotto et al. |
| 4,852,316 A | 8/1989 | Webb |
| 4,880,660 A | 11/1989 | Aasen et al. |
| 4,886,852 A | 12/1989 | Numa |
| 4,904,522 A | 2/1990 | Markusch |
| 4,908,229 A | 3/1990 | Kissel |
| 4,916,004 A | 4/1990 | Ensminger et al. |
| 5,017,632 A | 5/1991 | Bredow et al. |
| 5,073,578 A | 12/1991 | Boodaghains et al. |
| 5,075,370 A | 12/1991 | Kubitza et al. |
| 5,100,948 A | 3/1992 | Aydin et al. |
| 5,157,074 A | 10/1992 | Metzger et al. |
| 5,191,012 A | 3/1993 | Markusch et al. |
| 5,212,230 A | 5/1993 | Tirpak et al. |
| 5,221,710 A | 6/1993 | Markusch et al. |
| 5,236,994 A | 8/1993 | Markusch et al. |
| 5,262,444 A | 11/1993 | Rusincovitch et al. |
| 5,296,530 A | 3/1994 | Bors et al. |
| 5,356,716 A | 10/1994 | Patel |
| 5,371,148 A | 12/1994 | Taylor et al. |
| 5,407,783 A * | 4/1995 | Caruso ............. 430/288.1 |
| 5,409,984 A | 4/1995 | Gerhardinger |
| 5,418,264 A | 5/1995 | Obloh et al. |
| 5,426,142 A | 6/1995 | Rosano et al. |
| 5,461,125 A | 10/1995 | Lu et al. |
| 5,468,804 A | 11/1995 | Schmalstieg et al. |
| 5,478,601 A | 12/1995 | Larson et al. |
| 5,484,849 A | 1/1996 | Bors et al. |
| 5,500,457 A | 3/1996 | Sarkar et al. |
| 5,534,310 A | 7/1996 | Rokowski et al. |
| 5,559,192 A | 9/1996 | Bors et al. |
| 5,562,953 A | 10/1996 | Bors et al. |
| 5,567,767 A | 10/1996 | Smeal et al. |
| 5,569,686 A | 10/1996 | Makati et al. |
| 5,571,863 A | 11/1996 | Smeal et al. |
| 5,672,379 A | 9/1997 | Schall et al. |
| 5,679,721 A | 10/1997 | Courtoy et al. |
| 5,681,385 A | 10/1997 | Beckenhauer |
| 5,688,867 A | 11/1997 | Scheibelhoffer et al. |
| 5,708,077 A | 1/1998 | Nölken et al. |
| 5,708,093 A | 1/1998 | Bastelberger et al. |
| 5,718,943 A | 2/1998 | Hsu et al. |
| 5,766,768 A | 6/1998 | Cummings et al. |
| 5,777,053 A | 7/1998 | McBain et al. |
| 5,780,117 A | 7/1998 | Swartz et al. |
| 5,798,426 A | 8/1998 | Anton et al. |
| 5,814,397 A | 9/1998 | Cagliostro et al. |
| 5,869,590 A | 2/1999 | Clark et al. |
| 5,874,503 A | 2/1999 | Scheibelhoffer et al. |
| 5,928,778 A | 7/1999 | Takahashi et al. |
| 5,945,044 A | 8/1999 | Kawai et al. |
| 5,962,571 A | 10/1999 | Overbeek et al. |
| 5,973,068 A | 10/1999 | Yamaya et al. |
| 5,994,428 A | 11/1999 | Lutz et al. |
| 5,997,952 A | 12/1999 | Harris et al. |
| 6,007,619 A | 12/1999 | Laas et al. |
| 6,008,289 A | 12/1999 | König et al. |
| 6,011,078 A * | 1/2000 | Reich et al. ............. 522/86 |
| 6,030,447 A | 2/2000 | Naji et al. |
| 6,045,871 A | 4/2000 | Matt et al. |
| 6,045,873 A | 4/2000 | Adachi et al. |
| 6,048,471 A | 4/2000 | Henry |
| 6,063,864 A | 5/2000 | Mathur et al. |
| 6,103,352 A | 8/2000 | Takahashi |
| 6,114,440 A | 9/2000 | Yamaya et al. |
| 6,136,383 A | 10/2000 | Schwartz et al. |
| 6,146,710 A | 11/2000 | Symons |
| 6,162,511 A | 12/2000 | Garnett et al. |
| 6,235,228 B1 | 5/2001 | Nicholl et al. |
| 6,297,320 B1 | 10/2001 | Tang et al. |
| 6,346,146 B1 | 2/2002 | Duselis et al. |
| 6,395,827 B1 | 5/2002 | Pears et al. |
| 6,398,976 B1 | 6/2002 | Sandoval et al. |
| 6,417,267 B1 | 7/2002 | Stockl et al. |
| 6,426,414 B1 | 7/2002 | Laas et al. |
| 6,453,960 B1 | 9/2002 | Kondo et al. |
| 6,458,250 B1 | 10/2002 | Holliday et al. |
| 6,475,556 B1 | 11/2002 | Sobczak et al. |
| 6,485,601 B1 | 11/2002 | Egan et al. |
| 6,485,793 B1 | 11/2002 | Ott et al. |
| 6,492,450 B1 | 12/2002 | Hsu |
| 6,506,248 B1 | 1/2003 | Duselis et al. |
| 6,534,176 B2 * | 3/2003 | Terase et al. ............. 428/403 |
| 6,555,625 B1 | 4/2003 | Overbeek et al. |
| 6,590,025 B1 | 7/2003 | Carlson et al. |
| 6,635,735 B1 | 10/2003 | Zhang et al. |
| 6,638,567 B1 | 10/2003 | Beisele |
| 6,638,998 B2 | 10/2003 | Zhao et al. |
| 6,641,629 B2 | 11/2003 | Safta et al. |
| 6,649,679 B1 | 11/2003 | Stockl et al. |
| 6,660,386 B2 | 12/2003 | Haque |
| 6,696,518 B1 | 2/2004 | Dersch et al. |
| 6,740,423 B2 | 5/2004 | Murase |
| 6,753,394 B2 | 6/2004 | Weikard et al. |
| 6,762,230 B2 | 7/2004 | Brandenburger et al. |
| 6,818,697 B2 | 11/2004 | Zhang et al. |
| 6,849,338 B2 | 2/2005 | Clemens et al. |
| 6,893,751 B2 | 5/2005 | Naji et al. |
| 6,941,720 B2 | 9/2005 | DeFord et al. |
| 6,998,012 B2 | 2/2006 | Koelliker et al. |
| 7,049,352 B2 | 5/2006 | Gould et al. |
| 7,101,921 B2 | 9/2006 | Edwards et al. |
| 7,105,593 B2 | 9/2006 | Solomon et al. |
| 7,148,270 B2 | 12/2006 | Bowe |
| 7,235,595 B2 | 6/2007 | Hermes et al. |
| 7,235,603 B2 | 6/2007 | Madle et al. |
| 7,238,391 B2 | 7/2007 | Dargontina et al. |
| 7,247,671 B2 | 7/2007 | Overbeek et al. |
| 7,265,166 B2 | 9/2007 | Gebhard et al. |
| 7,338,989 B2 | 3/2008 | Gross et al. |
| 7,381,785 B2 | 6/2008 | Detrembleur et al. |
| 7,449,516 B2 | 11/2008 | Bayer et al. |
| 7,758,954 B2 | 7/2010 | Nguyen et al. |
| 7,812,090 B2 | 10/2010 | Killilea et al. |
| 2002/0007009 A1 | 1/2002 | Stark et al. |
| 2002/0009622 A1 | 1/2002 | Goodson |
| 2002/0081437 A1 | 6/2002 | Dargontina et al. |
| 2002/0179240 A1 | 12/2002 | Clemens et al. |
| 2002/0195191 A1 | 12/2002 | Weiss et al. |
| 2003/0027915 A1 | 2/2003 | Gerst et al. |
| 2003/0055171 A1 | 3/2003 | Overbeek et al. |
| 2003/0073778 A1 | 4/2003 | Zhang et al. |
| 2003/0089061 A1 | 5/2003 | DeFord et al. |
| 2003/0150359 A1 | 8/2003 | Lassmann |

| | | | |
|---|---|---|---|
| 2003/0153673 A1 | 8/2003 | Schwalm et al. | |
| 2003/0203991 A1 | 10/2003 | Schottman et al. | |
| 2003/0207121 A1 | 11/2003 | McGee | |
| 2003/0224184 A1 | 12/2003 | Hermes et al. | |
| 2004/0002559 A1 | 1/2004 | Troutman et al. | |
| 2004/0044094 A1 | 3/2004 | Garnett | |
| 2004/0068045 A1 | 4/2004 | Betremieux et al. | |
| 2004/0077782 A1 | 4/2004 | Heldmann et al. | |
| 2004/0082715 A1 | 4/2004 | Bayer et al. | |
| 2004/0086676 A1 | 5/2004 | Peng | |
| 2004/0161542 A1 | 8/2004 | Ziemann et al. | |
| 2004/0176502 A1 | 9/2004 | Raymond et al. | |
| 2004/0198903 A1 | 10/2004 | Madle et al. | |
| 2004/0229978 A1 | 11/2004 | Bowe | |
| 2005/0009954 A1 | 1/2005 | Gebhard et al. | |
| 2005/0020718 A1 | 1/2005 | Gosse et al. | |
| 2005/0027079 A1 | 2/2005 | Lauer et al. | |
| 2005/0053797 A1 | 3/2005 | Rumph et al. | |
| 2005/0126430 A1 | 6/2005 | Lightner, Jr. et al. | |
| 2005/0176321 A1 | 8/2005 | Crette et al. | |
| 2005/0203211 A1 | 9/2005 | Gebhard | |
| 2005/0208285 A1 | 9/2005 | Lyons et al. | |
| 2006/0013950 A1 | 1/2006 | Porter et al. | |
| 2006/0024480 A1 | 2/2006 | Lyons et al. | |
| 2006/0046068 A1 | 3/2006 | Barancyk et al. | |
| 2006/0048708 A1 | 3/2006 | Hartig | |
| 2006/0111503 A1 | 5/2006 | Killilea et al. | |
| 2006/0135684 A1* | 6/2006 | Killilea | 524/556 |
| 2006/0135686 A1* | 6/2006 | Killilea et al. | 524/556 |
| 2006/0182946 A1* | 8/2006 | Zarb et al. | 428/312.4 |
| 2006/0288909 A1 | 12/2006 | Naji et al. | |
| 2007/0042192 A1 | 2/2007 | Nguyen et al. | |
| 2007/0110981 A1 | 5/2007 | Killilea et al. | |
| 2007/0149077 A1 | 6/2007 | Stanislawczyk et al. | |
| 2007/0213445 A1 | 9/2007 | Klijn et al. | |
| 2007/0259166 A1* | 11/2007 | Killilea et al. | 428/294.7 |
| 2007/0259188 A1 | 11/2007 | Wu et al. | |
| 2007/0269660 A1 | 11/2007 | Killilea et al. | |
| 2007/0282046 A1 | 12/2007 | Killilea et al. | |
| 2008/0008895 A1 | 1/2008 | Garner et al. | |
| 2008/0139737 A1 | 6/2008 | Alderfer et al. | |
| 2008/0141908 A1 | 6/2008 | Peng et al. | |

FOREIGN PATENT DOCUMENTS

| | | |
|---|---|---|
| AU | 2005100347 B4 | 5/2005 |
| DE | 33 02 767 A1 | 8/1984 |
| EP | 0 060 505 A1 | 9/1982 |
| EP | 486 278 A1 | 5/1992 |
| EP | 0 623 659 A2 | 11/1994 |
| EP | 0 640 629 A1 | 3/1995 |
| EP | 0 697 417 A1 | 2/1996 |
| EP | 0705 855 A2 | 4/1996 |
| EP | 0 725 088 A1 | 8/1996 |
| EP | 0 728 779 B2 | 8/1996 |
| EP | 0 757 059 A1 | 2/1997 |
| EP | 0 894 780 A1 | 2/1999 |
| EP | 1 118 632 A2 | 7/2001 |
| EP | 1 170 340 A1 | 1/2002 |
| EP | 1 454 935 A1 | 9/2004 |
| EP | 1 473 331 A1 | 11/2004 |
| EP | 1 505 088 A1 | 2/2005 |
| EP | 1 505 127 A1 | 2/2005 |
| EP | 1 589 083 A2 | 10/2005 |
| EP | 1 650 045 A2 | 4/2006 |
| EP | 1 798 258 A1 | 6/2007 |
| GB | 1 407 827 | 9/1975 |
| JP | 54 038323 | 3/1979 |
| JP | 01-229242 | 9/1989 |
| JP | 02 308887 | 12/1990 |
| JP | 08-059939 | 3/1996 |
| JP | 11 236281 | 8/1999 |
| JP | 03-44986 A | 12/2000 |
| JP | 2003 226835 A | 8/2003 |
| JP | 2003251269 | 9/2003 |
| JP | 2004 010805 A | 1/2004 |
| JP | 2004 250607 A2 | 9/2004 |
| JP | 2004 292748 A2 | 10/2004 |
| JP | 2005307161 A | 11/2005 |
| JP | 2006 117812 | 5/2006 |
| SU | 833892 | 5/1981 |
| WO | WO 94/07674 A1 | 4/1994 |
| WO | WO 94/25499 A1 | 11/1994 |
| WO | WO 98/45222 | 10/1998 |
| WO | WO 99/67312 | 12/1999 |
| WO | WO 00/23495 A1 | 4/2000 |
| WO | WO 00/56826 | 9/2000 |
| WO | WO 01/68547 A1 | 9/2001 |
| WO | WO 02/070623 A2 | 9/2002 |
| WO | WO 03/000761 A1 | 1/2003 |
| WO | WO 03/076536 A1 | 9/2003 |
| WO | WO 03/101918 A2 | 12/2003 |
| WO | WO 2005/071179 A1 | 8/2005 |
| WO | WO 2006/032512 A | 3/2006 |
| WO | WO 2006/065914 A1 | 6/2006 |
| WO | WO 2007/059516 A1 | 5/2007 |
| WO | WO 2007/087458 A1 | 8/2007 |
| WO | WO/2007/089807 A2 | 8/2007 |
| WO | WO 2007/089913 A1 | 8/2007 |
| WO | WO 2007/090132 A1 | 8/2007 |
| WO | WO 2008/018910 A2 | 2/2008 |

OTHER PUBLICATIONS

Hardiplank™ Lap Siding Installation, James Hardie Siding Products, 8 pages, (Dec. 2005), http://www.jameshardie.com/homeowner/technical/installation/hardieplank_installation.php, downloaded from the Dec. 15, 2005 Internet Archive entry at: http://web.archive.org/web/20051215084041/http://www.jameshardie.com/homeowner/installation/hardiplank_installation.php.

"Siding Painting Tips", Paint Manufacturers' Recommendation Sheet—No. S-100, James Hardie Siding Products, 10 pages, (May 2005), http://www.jameshardie.com/homeowner/technical/paintingtips.php, downloaded from the Dec. 14, 2005 Internet Archive entry at: http://web.archive.org/web/20051214022056/http://www.jameshardie.com/homeowner/technical/paintingtips.php.

ISR and Written Opinion PCT/US2007/061326 dated May 15, 2007.

ASTM D6944-03, Test Method A.

Koleske et al., *Two Thousand Three Additives Guide*, Paint and Coatings Industry, Apr. 2003, pp. 1-76.

Witzeman, J. S. et al., *Comparison of Methods for the Preparation of Acetoacetylated Coating Resins*, Coatings Technology; vol. 62, No. 789, Oct. 1990, pp. 101-112 (and references contained therein).

Clemens, R. J. et al., *A Comparison of Catalysts for Crosslinking Acetoacetylated Resins via the Michael Reaction*, Journal of Coatings Technology, Mar. 1989, vol. 61, No. 770, pp. 83-91.

Clemens, R. J., *A Comparison of Catalysts for Crosslinking Acetoacetylated Resins via the Michael Reaction*, Water-Borne & Higher Solids Coatings Symposium, 1988, New Orleans, LA, 55-67.

Wicks, Z.W. et al., *Epoxy and Phenolic Resins*, Organic Coatings Science and Technology, vol. 1, Chapter XI, pp. 162-187.

Tennebroek et al., *New Polymer Synthesis for (self) Crosslinkable Urethanes and Urethane Acrylics*, $4^{th}$ Nürnberg Congress; International Centre for Coatings Technology, Paper 17, 2000, 19 pages.

Geurts, J.M. et al., *Self-crosslinkable Urethanes and Urethane/Acrylics*, Verfkroniek Nummer, Jan. 1999.

Geon® Lo -Sope Dispersion Resin, Geon® 171 Vinyl Chloride Homopolymer Technical Data Sheet, PolyOne Corporation, May 2003, 2 pages.

Geon Copolymer Dispersion Resin Geon® 137 Vinyl Chloride Copolymer Technical Data Sheet, PolyOne Corporation, Apr. 1997, 2 pages.

Industrial Research Services, *Test Report No. 54703-1 for Epirez Safe Step 100*, CSIRO, Manuf. & Infrastr. Technology, Australia, May 2004, pp. 1-6.

DSM NeoResins, Technical Data Sheet, DSM NeoResins Inc. ,Bulletin XK-90, Jan. 2006, 6 pages.

Tex•Cote® Stretch Product Information, Textured Coatings of America, Inc., Panama City, Florida, Nov. 2003, 3 pages.

UCAR Emulsion Systems Applications, *Architectural Coatings-Exterior-Cement Fiber Board*, Dow Chemical Company product information sheet printed on Oct. 25, 2007 from the following internet archives website at: http://web.archive.org/web/20041022123748/http://www.dow.com/ucarlatex/app/arch/ex_fiber.htm.

Rector, F.D. et al., *Applicatons for the Acetoacetyl Chemistry in Thermoset Coatings*, Journal of Coatings Technology, vol. 61, No. 771, Apr. 1989.

"UV Cured Undercoat Vitrecure 7", Product Data Sheet 74, Architectural & Industrial Coatings, 1 page (Dec. 21, 2004).

"UV Cured Sealer for Cement Based Substrates Vitrecure 9", Product Data Sheet 54, Architectural & Industrial Coatings, 1 page (Jul. 24, 2004).

Fox, T. G., "Influence of diluent and of copolymer composition on the glass temperature of a polymer system", Bull. Am. Phys. Soc. I (3), 123 (1956).

PQ® Potassium Silicates, PQ Corporation Brochure, (2004).

Araujo, P.H.H. et al., "Techniques for Reducing Residual Monomer Content in Polymers: A Review", Polymer Engineering and Science, vol. 42, No. 7, pp. 1442-1468 (Jul. 2002).

Epoxy Resins Chemistry and Technology 2nd Edition, Revised and Expanded—Tanaka, Yoshio: Synthesis and Characteristics of Epoxides, p. 54 (1988).

"*ASTM C920-11 Standard Specification for Elastomeric Joint Sealants*" Abstract, Book of Standards, 2 pages, (Volume Apr. 2007).

"*ASTM C834-10 Standard Specification for Latex Sealants*" Abstract, Book of Standards, 2 pages, (Volume Apr. 2007).

Gardner's Commercially Important Chemicals, edited by G.W.A Milne, Wiley, p. 573 (2005).

NaH2PO4 MSDS, found at http://muby.itgo.com/MSDS/sodium_phosphate_monobasic_anhyd%20MSDS.htm.

"Ancarez AR550 Waterborne Epoxy Resin Technical Bulletin", Air Products and Chemicals, Inc., High Performance Coatings Resins, Pub. No. 125-9914, 13 pages, (Mar. 2006).

"Anquamine 401 Curing Agent Technical Bulletin", Air Products and Chemicals, Inc., Epoxy Curing Agents and Modifiers, Publication No. 125-9744,1 pages, (May 2004).

"Polycat 41 Catalyst", Product Information Sheet, Air Products and Chemicals, Inc., 2 pages, (2003).

American Society of Testing Materials, ASTM Designation: D523-89 (Reapproved 1999), "Standard Test Method for Specular Gloss;" 5 pages.

American Society of Testing Materials, ASTM, Designation: D5402-93 (Reapproved 1999), "Standard Practice for Assessing the Solvent Resistance of Organic Coatings Using Solvent Rubs;" 3 pages.

Eastman Chemical Company, Publications N-319C, Kingport, TN., Dec. 1999, Title Page, Table of Contents, "Acetoacetoxyethyl Methacrylate (AAEM) Acetoacetyl Chemistry," pp. 1-11.

Lewis et al., "Luminescence", Hawley's Condensed Chemical Dictionary, 14$^{th}$ Ed., John Wiley and Sons, Inc., retrieved from Knovel® online; 1 page (2002).

"Photoinitiators for UV Curing," "Darocur 1173", p. 2; Ciba Specialty Chemicals; 8 pages (2003).

U.S. Federal Register, vol. 60, No. 116, pp. 31633-31637, Jun. 16, 1995.

Wicks, Zeno W. Jr., et al., "Latexes", Organic Coatings, Science and Technology, Second Edition, (Wiley-Interscience, New York, 1999), Title Page, Copyright Page, Chapter 8, p. 143.

ASTM D6944-03, Test Method A (2003).

Witzeman, J. S. et al., *Comparison of Methods for the Preparation of Acetoacetylated Coating Resins*, Coatings Technology; vol. 62, No. 789, pp. 101-112 (Oct. 1990).

Wicks, Z.W. et al.,*Epoxy and Phenolic Resins*, Organic Coatings Science and Technology, vol. 1, Chapter XI, pp. 162-187 (1992).

\* cited by examiner

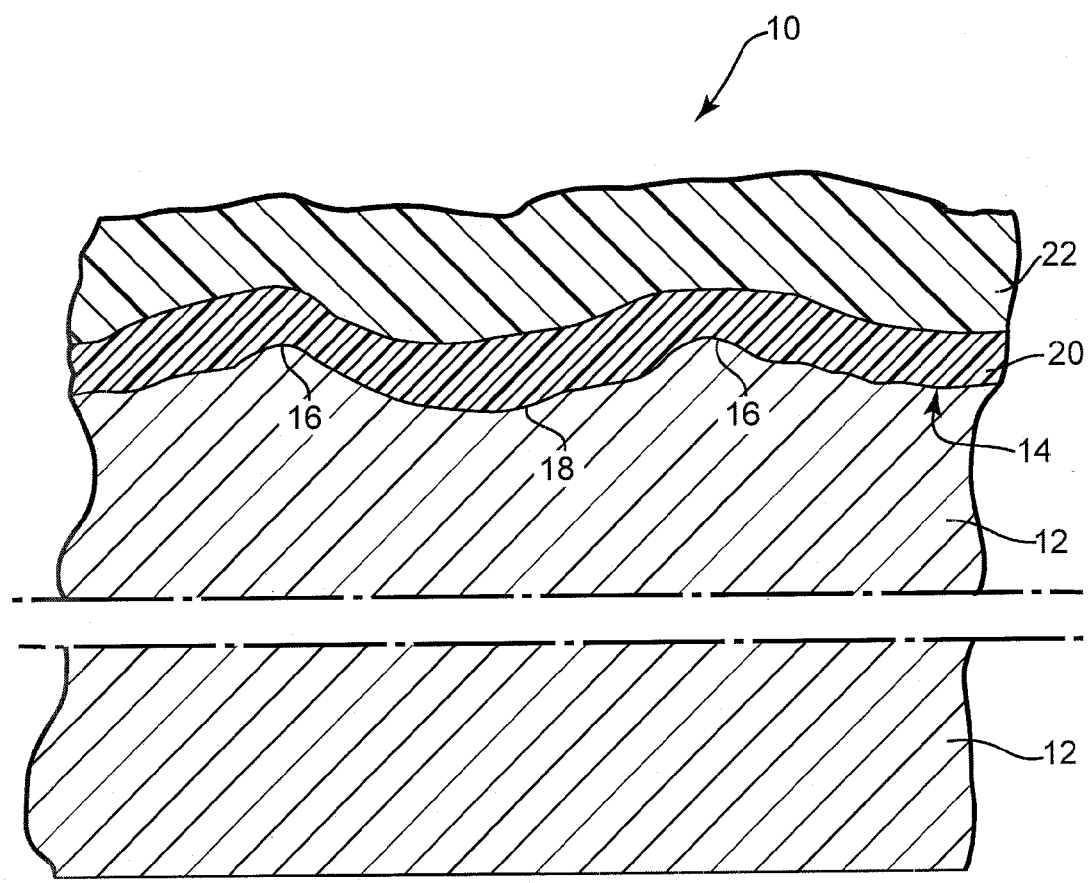

COATING SYSTEM FOR CEMENT COMPOSITE ARTICLES

CROSS-REFERENCE TO RELATED APPLICATION

This application claims priority from U.S. Provisional Application Ser. No. 60/764,103, filed Jan. 31, 2006, the disclosure of which is incorporated herein by reference.

BACKGROUND OF THE INVENTION

Cement composite articles are becoming more and more common for use in building materials. Many of these articles are prepared from inexpensive materials, such as cement, wood (cellulose) fibers, natural (glass) fibers and polymers. These articles usually are prepared in the form of cement fiberboard substrates such as siding panels and boards. The substrate or articles can be made using methods such as extrusion or using a Hatschek machine.

In northern climates, damage from repeated freezing and thawing of water absorbed into the cement fiberboard substrate represents a significant problem. Continued exposure to moisture, freeze-thaw cycles, UV exposure and atmospheric carbon dioxide can cause physical and chemical changes in articles made from cement fiberboard compositions over time. Coating systems or coating compositions can prevent exposure to the elements such as UV light, carbon dioxide and water, or can help reduce the damage that can occur due to exposure to these elements. Several such systems are available for protecting cement fiberboard articles. However, there is a need for coating systems and coating compositions that provide a superior seal, have the ability to cure rapidly or can provide improved results when an article coated with the composition is submitted to wet adhesion testing and multiple freeze-thaw cycles.

SUMMARY

The present invention provides in one aspect a coated article comprising a cement fiberboard substrate and a radiation-curable coating system applied to the substrate, wherein the coating system includes an aqueous dispersion of water-dispersible polymer particles and one or more olefinic compounds. The disclosed coating system includes one or more coating compositions that may be applied in one or more layers, wherein each of the coating compositions is preferably an aqueous composition, or can be mixed with another composition (e.g., on the substrate) to form an aqueous composition. The coating systems may optionally include a photoinitiator system.

In another aspect, the invention provides a method for preparing a coated article, which method comprises providing a cement fiberboard substrate, coating at least a portion of the substrate with the above-described coating system and radiation-curing the coating.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the accompanying drawing and the description below. Other features, objects, and advantages of the invention will be apparent from the description and drawings, and from the claims.

BRIEF DESCRIPTION OF THE DRAWING

FIG. 1 is a schematic cross-sectional view of a coated fiber cement article.

Like reference symbols in the various figures of the drawing indicate like elements. The elements in the drawing are not to scale.

DETAILED DESCRIPTION

A "water-dispersible" polymer means a polymer which is capable of being combined by itself with water, without requiring the use of a secondary dispersing or emulsifying agent, to obtain an aqueous dispersion or emulsion of polymer particles having at least a one month shelf stability at normal storage temperatures.

A "latex" polymer means a dispersion or emulsion of polymer particles in water containing one or more secondary dispersing or emulsifying agents (e.g., a surfactant, alkali-soluble polymer or mixtures thereof) whose presence is required to form the dispersion or emulsion. The secondary dispersing or emulsifying agent is typically separate from the polymer after polymer formation. In some embodiments a reactive dispersing or emulsifying agent may become part of the polymer particles as they are formed.

The terms "a," "an," "the," "at least one," and "one or more" are used interchangeably.

The recitation of numerical ranges by endpoints includes all numbers subsumed within that range (e.g., 1 to 5 includes 1, 1.5, 2, 2.75, 3, 3.80, 4, 5, etc.).

The term "comprises" and variations thereof does not have a limiting meaning where such term appears in the description or claims. Thus, for example, a composition comprising a wax compound means that the composition includes one or more wax compounds.

The terms "acrylate esters" and "methacrylate esters" refer to esters of acrylic acid and esters of methacrylic acid, respectively. They may be referred to as (meth)acrylates or (meth)acrylate esters.

The term "olefinic compound" refers to any monomer, oligomer or polymer containing reactive ethylenic unsaturation, such as vinyls, (meth)acrylates, vinyl ethers, allyl ethers, vinyl esters, unsaturated oils (including mono, di and triglycerides), unsaturated fatty acids, and the like. The term "olefinic group" refers to the reactive ethylenic unsaturated functional group in an olefinic compound.

The present invention provides a coating system for a cement fiberboard substrate, such as a cement fiberboard siding product or other cement composite article. The coating system is a radiation-curable coating system applied to the substrate, wherein the coating system includes an aqueous dispersion of water-dispersible polymer particles and one or more olefinic compounds. The coating system includes one or more coating compositions that may be applied in one or more layers, wherein each of the one or more coating compositions is preferably an aqueous composition or can be mixed with another composition (e.g., on the substrate) to form an aqueous composition. Optional ingredients including latex polymers, water-soluble silicates or photoinitiators may also be included in the disclosed coating systems.

Referring to FIG. 1, a coated article 10 of the present invention is shown in schematic cross-sectional view. Article 10 includes a cement fiberboard substrate 12. Substrate 12 typically is quite heavy and may for example have a density of about 1 to about 1.6 g/cm$^3$ or more. The first major surface 14 of substrate 12 may be embossed with small peaks or ridges 16 and valleys 18, e.g., so as to resemble roughsawn wood. Major surface 14 may have a variety of other surface configurations, and may resemble a variety of building materials other than roughsawn wood. Layer or layers 20 of the disclosed coating system lie atop and partially penetrate surface 14, and desirably are applied to article 10 at the location where article 10 is manufactured. Layers 20 help to protect substrate 12 against one or more of exposure to moisture, freeze-thaw cycles, UV exposure or atmospheric carbon dioxide. Layers 20 also may provide a firmly-adhered base layer upon which one or more firmly-adhered layers of final topcoat 22 may be formed. Final topcoat 22 desirably is both decorative and weather-resistant, and may be applied to article 10 at the location where article 10 is manufactured or after article 10 has been attached to a building or other surface.

A variety of cement fiberboard substrates may be employed in the disclosed articles. The disclosed substrates typically include cement and a filler. Exemplary fillers include wood, fiberglass, polymers or mixtures thereof. The substrates can be made using methods such as, extrusion, the Hatschek method, or other methods known in the art. See, e.g., U.S. Patent Application No. 2005/0208285 A1 (corresponds to International Patent Application No. WO 2005/071179 A1); Australian Patent Application No. 2005100347; International Patent Application No. WO 01/68547 A1; International Patent Application No. WO 98/45222 A1; U.S. Patent Application No. 2006/0288909 A1; and Australian Patent Application No. 198060655 A1. Non-limiting examples of such substrates include siding products, boards and the like, for uses including fencing, roofing, flooring, wall boards, shower boards, lap siding, vertical siding, soffit panels, trim boards, shaped edge shingle replicas and stone or stucco replicas. One or both major surfaces of the substrate may be profiled or embossed to look like a grained or roughsawn wood or other building product, or scalloped or cut to resemble shingles. The uncoated substrate surface typically contains a plurality of pores with micron- or submicron-scale cross-sectional dimensions.

A variety of suitable fiber cement substrates are commercially available. For example, several preferred fiber cement siding products are available from James Hardie Building Products Inc. of Mission Viejo, Calif., including those sold as HARDIEHOME™ siding, HARDIPANEL™ vertical siding, HARDIPLANK™ lap siding, HARDIESOFFIT™ panels, HARDITRIM™ planks and HARDISHINGLE™ siding. These products are available with an extended warranty, and are said to resist moisture damage, to require only low maintenance, to not crack, rot or delaminate, to resist damage from extended exposure to humidity, rain, snow, salt air and termites, to be non-combustible, and to offer the warmth of wood and the durability of fiber cement. Other suitable fiber cement siding substrates include AQUAPANEL™ cement board products from Knauf USG Systems GmbH & Co. KG of Iserlohn, Germany, CEMPLANK™, CEMPANEL™ and CEMTRIM™ cement board products from Cemplank of Mission Viejo, Calif.; WEATHERBOARDS™ cement board products from CertainTeed Corporation of Valley Forge, Pa.; MAXITILE™, MAXISHAKE™ AND MAXISLATE™ cement board products from MaxiTile Inc. of Carson, Calif.; BRESTONE™, CINDERSTONE™, LEDGESTONE™, NEWPORT BRICK™, SIERRA PREMIUM™ and VINTAGE BRICK™ cement board products from Nichiha U.S.A., Inc. of Norcross, Ga., EVERNICE™ cement board products from Zhangjiagang Evernice Building Materials Co., Ltd. of China and E BOARD™ cement board products from Everest Industries Ltd. of India.

The disclosed articles may be coated on one or more surfaces with the disclosed radiation-curable coating system. The coating system includes one or more coating compositions that may be applied in one or more layers. The coating systems may be provided in a variety of embodiments. Exemplary embodiments include: (i) at least one water-dispersible polymer and at least one olefinic compound; (ii) at least one water-dispersible polymer, at least one olefinic compound and at least one water-soluble silicate salt; (iii) at least one water-dispersible polymer, at least one latex polymer and at least one olefinic compound; or (iv) at least one water-dispersible polymer, at least one latex polymer, at least one olefinic compound and at least one water-soluble silicate salt. These various embodiments may be applied to the substrate and cured using radiation (e.g., electron beam or UV light).

In another embodiment, the coating system includes a first coating composition that includes at least one olefinic compound, and a second coating composition that includes at least one water-dispersible polymer. The two coating compositions may be applied to the substrate sequentially or concurrently and sequentially or simultaneously cured using radiation.

In another embodiment, the coating system includes a first coating composition that includes at least one olefinic compound, and a second coating composition that includes at least one water-dispersible polymer and at least one latex polymer. The two coating compositions may be applied to the substrate sequentially or concurrently and sequentially or simultaneously cured using radiation.

Persons having ordinary skill in the art will appreciate that other embodiments may be envisioned, such as a coating system including a first coating composition that includes at least one water-dispersible polymer and at least one olefinic compound, and a second coating composition that includes at least one latex polymer; or a first coating composition that includes at least one latex polymer and at least one olefinic compound, and a second coating composition that includes at least one water-dispersible polymer. Also, any of the above-mentioned first and second coating compositions may contain a water-soluble silicate salt.

The olefinic compound in the disclosed coating systems appears to function as a reactive penetrant. This may be better appreciated by observing the coating system after it is applied to the substrate but before radiation curing is performed. The olefinic compound appears to improve wetting or penetration, and may help draw at least a portion of the water-dispersible polymer particles into pores in the substrate. The olefinic compound also appears to help the cured coating adhere to the substrate following cure. Preferred coating systems may also include one or more of the following additional features:

increasing the resistance of the article to water uptake (into the article);

improving or promoting adhesion of additional coatings to the article surface (e.g., topcoats);

increasing the surface integrity of the article (e.g., by acting to reinforce the fiber and cement matrix much like binder in other composite materials);

protecting against expansion of the article under freeze/thaw conditions; or increasing the integrity of the edges of the article by binding the fiber layers together.

A variety of polymeric materials may be employed in the disclosed water-dispersible polymers including (meth)acrylics, vinyls, oil-modified polymers, polyesters, polyurethanes, polyamides, chlorinated polyolefins, and mixtures or copolymers thereof. Exemplary water-dispersible polymers include polyurethanes, polyamides, chlorinated polyolefins, (meth)acrylics, vinyls, oil-modified polymers, polyesters, and mixtures or copolymers thereof. The water-dispersible polymer typically will include as a part of the polymer a group or groups which render the polymer dispersible by itself in water. Preferably, the water-dispersible polymer is a water-dispersible polyurethane.

Water-dispersible polyurethanes may be made in a variety of ways. One method for preparing water-dispersible polyurethanes involves reacting one or more isocyanates with one or more hydroxy compounds that include an appropriate functional group. Exemplary such functional groups include salt-forming groups. For example, basic salt forming groups can be introduced by reacting a suitable compound (e.g., a polyisocyanate) with a compound containing active hydrogen groups and active basic groups neutralized with an acid. Exemplary compounds having active hydrogen groups and active basic groups include aliphatic, cycloaliphatic and heterocyclic amino alcohols, diols and triols, amines, diamines, triamines, tetramines and amides. Exemplary neutralizing acids include organic acids such as formic acid and acetic acid and inorganic acids such as hydrochloric acid and sulfuric acid. Polyurethanes can also be made water-dispersible by incorporating amine or acid functionality. Water-based anionically stabilized polyurethane polymers can be prepared by reacting polyols and dihydroxy carboxylic acid compounds with an excess of diisocyanate to provide a carboxylic acid functional prepolymer having NCO terminal groups. The acid groups can be neutralized with tertiary amines to provide salt groups and the neutralized prepolymer can be dispersed in water. The anionic stabilizing group of the water-dispersible polyurethane polymers may be replaced with a cationic stabilizing group or a nonionic stabilizing group, to facilitate water dispersibility. Thus, a polyurethane may be rendered water-dispersible by ionic stabilization using either an acid or a base.

It should be noted that the use of cationic stabilizing groups or nonionic stabilizing groups to facilitate combination of a water-dispersible polymer with water is not the same as a requirement to use a secondary dispersing or emulsifying agent to form an aqueous latex polymer.

The water-dispersible polymer may optionally also be functionalized with olefinic groups or other crosslinkable groups where it is desired to enable the water-dispersible polymer to participate in radiation curing. For example, olefinic groups may be introduced into a water-dispersible polyurethane by reacting a hydroxy-functional (meth)acrylate, hydroxy-functional allyl ether, hydroxy-functional vinyl ether, monoglycerides or diglycerides with the aforementioned isocyanate, or by reacting an ester polyol or oil-modified polymer (including alkyd oil-modified polymers) containing auto-oxidative carbon-carbon double bonds with the aforementioned isocyanate. Preferred olefinic groups include (meth)acrylate groups and groups containing auto-oxidative carbon-carbon double bonds. Exemplary isocyanates include diisocyanates, triisocyanates and other polyisocyanates. Preferred polyisocyanates have about 4 to 25 carbon atoms and about 2 to 4 isocyanate groups per molecule, and include aliphatic, cycloaliphatic and aromatic isocyanates, and mixtures thereof.

Exemplary hydroxy-functional (meth)acrylates include alkyl and cycloalkyl hydroxy-functional (meth)acrylates, such as 2-hydroxyethyl(meth)acrylates, 3-hydroxypropyl (meth)acrylates, 4-hydroxybutyl(meth)acrylates, 2-hydroxy-2-methylethyl(meth)acrylates, and 4-hydroxycyclohexyl (meth)acrylates, as well as other similar hydroxy-functional aliphatic (meth)acrylates. Other hydroxy-functional (meth)acrylates include hydroxy-functional (meth)acrylate polyesters such as caprolactone 2-((meth)acryloyloxy)ethyl esters, dicaprolactone 2-((meth)acryloyloxy)ethyl esters, higher molecular weight caprolactone homologues and hydroxy-functional (meth)acrylate polyethers.

Exemplary hydroxy-functional (meth)allyl ethers contain at least one hydroxyl group and one or more allyl ether groups, such as hydroxyethyl allyl ether, hydroxypropyl allyl ether, trimethylolpropane monoallyl ether, trimethylolpropane diallyl ether, trimethylolethane monoallyl ether, trimethylolpropane dimethallyl ether (TMPDE), and the like.

Exemplary hydroxy-functional vinyl ether compounds contain at least one hydroxyl group and one or more vinyl ether groups, such as 4-hydroxybutyl vinyl ether, cyclohexanedimethanol monovinyl ether, ethylene glycol monovinyl ether, diethylene glycol monovinyl ether, and the like.

Exemplary ester polyols containing auto-oxidative carbon-carbon double bonds may be made by reaction of an aromatic or aliphatic polyol containing at least two hydroxyl groups per molecule with an unsaturated fatty acid containing auto-oxidative carbon-carbon double bonds. Exemplary polyols include ethylene glycol, ethylene glycol, propylene glycol, 1,3-propane diol, 1,3-butylene glycol, 1,4-butane diol, bisphenol A, trimethylol propane, trimethylol ethane, pentaerythritol, glycerin, neopentyl glycol, cyclohexane dimethanol, and mixtures thereof. Exemplary unsaturated fatty acids include linoleic, palmitoleic, linolenic, eleostearic, arachidonic, ricinoleic, 10,12-octadecadienoic acid, and mixtures thereof.

Water-dispersible polyurethanes containing olefinic groups can also be prepared by utilizing the reaction product formed via transesterification of an oil containing auto-oxidative carbon-carbon double bonds with an aromatic or aliphatic polyol containing at least two hydroxyl groups per molecule. Exemplary oils include linseed oil, soybean oil, safflower oil, tall oil, sunflower oil, dehydrated caster oil, castor oil, ricine oil, tung oil, sardine oil, olive oil, cottonseed oil and mixtures thereof. Exemplary polyols include ethylene glycol, propylene glycol, 1,3-propane diol, 1,3-butylene glycol, 1,4-butane diol, bisphenol A, trimethylol propane, trimethylol ethane, pentaerythritol, glycerin, neopentyl glycol, cyclohexane dimethanol, and mixtures thereof.

The disclosed coating systems may optionally contain a latex polymer. Latex polymers are readily synthesized at modest cost and are typically prepared through chain-growth polymerization, using one or more olefinic compounds (preferably monomers). Non-limiting examples of olefinic compounds which may be used to prepare latex polymers include ethylene, butadiene, propene, butene, iso-butene, acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxypropyl acrylate, hydroxybutyl acrylate, hydroxybutyl methacrylate, glycidyl methacrylate, 4-hydroxybutyl acrylate glycidylether, acrylamide, methylacrylamide, styrene, α-methyl styrene, vinyl toluene, vinyl acetate, vinyl propionate, allyl methacrylate, acetoacetyl ethyl methacrylate (AAEM), diacetone acrylamide, dimethylaminomethacrylate, diethylaminomethacrylate, N-hydroxy(meth)acrylamide, vinyl ether maleate, vinyl esters of VERSATIC™ acid (VERSATIC acid is a synthetic saturated monocarboxylic acid of highly branched structure containing about 5 to about 10 carbon atoms), and mixtures thereof. Preferably, the latex polymer is a (meth)acrylic polymer.

The latex polymers are typically stabilized using one or more nonionic or anionic emulsifiers (viz., surfactants), used either alone or together. Examples of nonionic emulsifiers include tert-octylphenoxyethylpoly(39)-ethoxyethanol, dodecyloxypoly(10)ethoxyethanol, nonylphenoxyethyl-poly(40)ethoxyethanol, polyethylene glycol 2000 monooleate, ethoxylated castor oil, fluorinated alkyl esters and alkoxylates, polyoxyethylene(20)sorbitan monolaurate, sucrose monococoate, di(2-butyl)phenoxypoly(20)ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxyethylene(20)lauramide, N-lauryl-N-polyoxyethylene(3)amine and poly(10)ethylene glycol dodecyl thioether. Examples of anionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly(1)ethoxyethyl sulfate ammonium salt, sodium styrene sulfonate, sodium dodecyl allyl sulfosuccinate, linseed oil fatty acid, sodium or ammonium salts of phosphate esters of ethoxylated nonylphenol, sodium octoxynol-3-sulfonate, sodium cocoyl sarcocinate, sodium 1-alkoxy-2-hydroxypropyl sulfonate, sodium alpha-olefin ($C_{14}$-$C_{16}$) sulfonate, sulfates of hydroxyalkanols, tetrasodium N-(1,2-dicarboxy ethyl)-N-octadecylsulfosuccinamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypoly(39)ethoxyethyl sulfate and the like. In addition, combinations of emulsifiers can be used.

If desired, the latex polymers may be stabilized with an alkali-soluble polymer. Alkali-soluble polymers may be prepared by making a polymer with acrylic or methacrylic acid or other polymerizable acid monomer (usually greater than 10%) and solubilizing the polymer by addition of ammonia or other base. See, e.g., U.S. Patent Application Nos. US 2006/0135684 A1 and US 2006/0135686 A1. Examples of alkali-soluble polymers include JONCRYL™ 675 and JONCRYL 678. One exemplary process for preparing alkali soluble polymers is outlined in U.S. Pat. No. 5,962,571.

A water-soluble free radical initiator is typically used in the polymerization of a latex polymer. Exemplary water-soluble free radical initiators are described below. The amount of initiator is preferably from 0.01 wt. % to 3 wt. %, based on the total amount of monomer. In a redox system the amount of reducing agent is preferably from 0.01 wt. % to 3 wt. %, based on the total amount of monomer. The reaction temperature may be in the range of 10° C. to 100° C.

Exemplary commercially available latex polymers include AIRFLEX™ EF811 (available from Air Products), EPS 2505 (available from EPS/CCA) and NEOCAR™ 2300, NEOCAR 820 and NEOCAR 2535 (available from Dow Chemical Co.). Other exemplary latex polymers include the latex polymers described in co-pending U.S. Patent Application No. US 2007/0110981 A1.

The latex polymer may optionally also be functionalized with olefinic groups or other crosslinkable groups where it is desired to enable the latex polymer to participate in radiation curing. Exemplary functionalized latex polymers include ROSHIELD™ 3120 (available from Rohm & Haas) and the AAEM-functional latex polymers disclosed in U.S. Patent Application Nos. US 2006/0135684 A1 and US 2006/0135686 A1, and in the above-mentioned Application No. US 2007/0110981 A1.

Oil-modified polymers may if appropriately stabilized be used as water-dispersible polymers, or may be used as latex polymers. As used herein, oil-modified polymers include polymers that contain oils or oil based derivatives such as glyceride oils (monoglycerides, diglycerides, and the like), fatty acids, fatty amines, and mixtures thereof. Examples of such oil-modified polymers include alkyds, oil-modified polyurethanes, oil-modified polyamides, oil-modified acrylics, and mixtures or copolymers thereof. Preferably, the oil-modified polymer is an oil-modified polyurethane or an alkyd. Oil-modified polymers are readily synthesized and can be made to be water-dispersible if desired using conventional techniques.

The disclosed coating systems or coating compositions preferably contain about 90 to about 30% by weight water-dispersible polymer based on the total weight of the non-volatile components in the coating system, more preferably about 80 to about 35% by weight and most preferably about 70 to about 40% by weight. If a latex polymer is also employed, it may be present in an amount less than the amount of water-dispersible polymer.

A variety of olefinic compounds may be used in the disclosed coating systems. The olefinic compounds are distinct from the water-dispersible polymer, and are carbon-containing compounds having at least one site of unsaturation which can react, optionally in the presence of an initiator, to provide polymeric or crosslinked products. Non-limiting examples of olefinic compounds include monomers such as (meth)acrylates, vinyls, vinyl ethers, allyl ethers, vinyl esters, unsaturated oils (including mono-, di- and tri-glycerides), unsaturated fatty acids, and the like or mixtures thereof. The olefinic compounds also include oligomers or polymers having at least one site of unsaturation which can react, optionally in the presence of an initiator, to provide polymeric or crosslinked products.

Exemplary olefinic monomers include (meth)acrylate esters of =substituted or substituted $C_1$-$C_{15}$ alcohols such as tripropylene glycol, isobornyl alcohol, isodecyl alcohol, phenoxyethyl alcohol, tris-hydroxyethyl isocyanurate, trimethylolpropane ethoxylate, ditrimethylolpropane ethoxylate, hexanediol, ethoxylated neopentyl glycol, propoxylated neopentyl glycol, ethoxylated phenol, polyethylene glycol, bisphenol A ethoxylate, trimethylolpropane, propoxylated glycerol, pentaerythritol, tetrahydrofurfuryl alcohol, β-carboxyethyl alcohol, or combination thereof. For example, the olefinic monomer may be isobornyl (meth)acrylate, isodecyl (meth)acrylate, phenoxyethyl (meth)acrylate, trimethylolpropane tri(meth)acrylate, alkoxylated cyclohexane dimethanol di(meth)acrylate, trimethylolpropane ethoxylate tri(meth)acrylate, dipropylene glycol di(meth)acrylate, tripropylene glycol di(meth)acrylate, hexanediol di(meth)acrylate, tetrahydrofurfuryl (meth)acrylate, pentaerythritol tri(meth)acrylate, pentaerythritol tetra(meth)acrylate, di-ditrimethylolpropane tetra(meth)acrylate, propoxylated glycerol tri(meth)acrylate, beta-carboxyethyl (meth)acrylate, bisphenol A ethoxylate di(meth)acrylate, ethoxylated neopentyl glycol di(meth)acrylate, propoxylated neopentyl glycol di(meth)acrylate, or combination thereof. Preferred olefinic monomers include trimethylolpropane tri(meth)acrylate, bisphenol A ethoxylate di(meth)acrylate, propoxylated glycerol tri(meth)acrylate, trimethylolpropane ethoxylate tri(meth)acrylate, ditrimethylolpropane tetra(meth)acrylate, or combination thereof. The olefinic monomer may contain a ($C_1$-$C_{15}$) alcohol radical such as hydroxymethyl, 1-hydroxyethyl, 2-hydroxyethyl, 1-hydroxypropyl, 2-hydroxypropyl, 3-hydroxypropyl, 1-hydroxybutyl, 4-hydroxybutyl, 1-hydroxypentyl, 5-hydroxypentyl, 1-hydroxyhexyl, 6-hydroxyhexyl, 1,6-dihydroxyhexyl, 1,4-dihydroxybutyl, and the like.

Exemplary allyl ether monomers contain one or more allyl ether groups which typically are bonded to a core structural group which can be based on a wide variety of polyhydric alcohols. Non-limiting examples of suitable polyhydric alcohols include neopentyl glycol, trimethylolpropane, ethylene glycol, propylene glycol, butylene glycol, diethylene glycol, trimethylene glycol, triethylene glycol, trimethylolethane, pentaerythritol, glycerol, diglycerol, 1,4-butanediol, 1,6-hexanediol, 1,4-cyclohexanedimethanol, and any of the other polyols mentioned above in connection with the (meth)acrylate esters. Other exemplary allyl ether monomers include hydroxyethyl allyl ether, hydroxypropyl allyl ether, trimethylolpropane monoallyl ether, trimethylolpropane diallyl ether, trimethylolethane monoallyl ether, trimethylolethane diallyl ether, glycerol monoallyl ether, glycerol diallyl ether, pentaerythritol monoallyl ether, pentaerythritol diallyl ether, pentaerythritol triallyl ether, 1,2,6-hexanetriol monoallyl ether, 1,2,6-hexanetriol diallyl ether, and the like. Preferred allyl ethers include poly propoxylated and ethoxylated forms of allyl ethers.

Exemplary vinyl ether monomers contain one or more vinyl ether groups and include 4-hydroxybutyl vinyl ether, 1,4-cyclohexanedimethanol monovinyl ether, 1,4-cyclohexanedimethanol divinyl ether, ethylene glycol monovinyl ether, ethylene glycol divinyl ether, diethylene glycol monovinyl ether, diethylene glycol divinyl ether, triethylene glycol divinyl ether, and the like. Preferred vinyl ether monomers include propoxylated or ethoxylated forms of vinyl ether monomers.

The disclosed coating systems or coating compositions preferably contain about 2 to about 50% by weight separate olefinic compounds based on the total weight of the non-volatile components in the coating system, more preferably about 5 to about 40% by weight and most preferably about 10 to about 35% by weight.

A subset of the previously mentioned olefinic compounds (e.g., hexanediol di(meth)acrylate, trimethylolpropane tri(meth)acrylate and ditrimethylolpropane tetra(meth)acrylate have multiple (e.g., two or more) reactive groups. These monomers or oligomers can function as crosslinking agents. Crosslinking can also occur when the water-dispersible polymer or optional latex polymer have been functionalized so that the polymer can participate in radiation curing. As used herein, the term "reactive sites" or "active groups" refers to a group that can react to form a covalent bond linking or otherwise chemically joining two or more molecules.

The disclosed coating systems may include one or more optional water-soluble silicate salts. Visual observation of coating compositions containing such silicate salts indicated that inclusion of the silicate salt led to improved absorption of the coating composition into cement fiberboard substrates. Examples of silicate salts include lithium silicate, potassium silicate, sodium silicate, ammonium silicate and the like. In preferred embodiments, the amount of silicate salt is from about 2 to about 50% by weight, more preferably from about 5 to about 40% by weight and most preferably from about 10 to about 35% by weight, based on the total weight of the non-volatile components. Silicate salts are available through a variety of chemical suppliers. For example, sodium silicate (sometimes referred to as waterglass) is available in a variety of forms including sodium orthosilicate ($Na_4SiO_4$), sodium metasilicate ($Na_2SiO_3$), sodium polysilicate (($Na_2SiO_3$)n) and sodium pyrosilicate ($Na_6Si_2O_7$). Sodium silicate and potassium silicate (sometimes referred to as potassium waterglass) are available from PQ Corporation, Valley Forge, Pa.

Wet adhesion testing and "freeze-thaw" cycles have been shown, under laboratory conditions, to simulate long-term outdoor exposure encountered in northern climates. A Wet Adhesion Test may be carried out as follows to evaluate adhesion of the coating system after a coated cement fiberboard substrate has been saturated with water. According to this test procedure, coated substrates (e.g., fiber cement boards) are soaked in room temperature water for 24 hours. After soaking, the boards are removed from the water and kept at room temperature for 24 hours. A six-inch (15.24 cm) length of 3M HD 250 tape is applied to the surface of the board with the long axis of the tape in the direction of any embossing patterns that may be present. The tape is firmly pressed onto the board ensuring full contact. The tape is then removed by quickly pulling it off at a 90-degree angle to the board. "Wet Adhesion" performance is rated based on the percent of coating removed from the cement board. Performance is further assessed by noting where any failure occurs. For example, failure may occur between interfacial coating layers, between the coating and the surface of the board, or within the board itself. Preferred coating systems or coating compositions typically have less than 25% coating removal, more preferably less than 15% coating removal. In addition, the failure preferably is within the board as indicated by a significant amount of fiber from the board adhering to the removed coating.

Preferred coated articles can withstand at least 30 freeze-thaw cycles, when tested according to ASTM D6944-03, Test Method A. As written, this ASTM test method recites a 30-cycle sequence. However, rather than simply grade a specimen as a "pass" at the end of 30 cycles, the test desirably is lengthened to include additional cycles. More preferably, the coated articles can withstand at least 75 freeze-thaw cycles, most preferably at least 125 freeze-thaw cycles and optimally at least 175 freeze-thaw cycles.

The disclosed coating systems or coating compositions preferably have improved, viz., lower, volatile organic content (VOC). The coating systems or coating compositions desirably have a VOC of less than about 5%, based on the total weight of the coating system, preferably a VOC of less than about 2%, more preferably a VOC of less than about 0.5%.

The olefinic compounds are curable by radiation, e.g., visible light, ultra violet light, electron beam, and the like. An initiator system is not required for electron beam curing but for other radiation sources typically will be chosen based on the particular type of curing energy (e.g., UV, visible light or other energy) and curing mechanism (e.g., free-radical, cationic or other curing mechanism) employed. Thus in one preferred embodiment, the coating system is electron beam curable and does not require an initiator. In another preferred embodiment, the coating system is UV curable and free-radically polymerizable, and includes a UV photoinitiator system which generates free radicals in response to UV light and thereby cures the coating.

Non-limiting examples of initiators include peroxide compounds, azo compounds, cationic-generating initiators, cleavage-type initiators, hydrogen abstraction-type initiators, and the like. Exemplary peroxide compounds include t-butyl perbenzoate, t-amyl perbenzoate, cumene hydroperoxide, t-amyl peroctoate, methyl ethyl ketone peroxide, benzoyl peroxide, cyclohexanone peroxide, 2,4-pentanedione peroxide, di-t-butyl peroxide, t-butyl hydroperoxide and di-(2-ethylhexyl)-peroxydicarbonate. Preferably, the curing agent is t-butyl perbenzoate, methyl ethyl ketone peroxide, or cumene hydroperoxide. Methyl ethyl ketone peroxide conveniently is employed as a solution in dimethyl phthalate, e.g., LUPERSOL™ DDM-9 from Ato-Chem.

Exemplary azo compounds include 2,2-azo bis-(2,4-dimethylpentane-nitrile), 2,2-azo bis-(2-methylbutanenitrile) and 2,2-azo bis-(2-methylpropanenitrile).

Exemplary cationic-generating photoinitiators include super acid-generating photoinitiators such as triaryliodonium salts, triarylsulfonium salts and the like. A preferred triarylsulfonium salt is triphenyl sulfonium hexafluorophosphate.

Exemplary cleavage-type photoinitiators include α,α-diethoxyacetophenone (DEAP); dimethoxyphenylacetophenone (IRGACURE™ 651); hydroxycyclo-hexylphenylketone (IRGACURE™ 184); 2-hydroxy-2-methyl-1-phenylpropan-1-one (DAROCUR™ 1173); a 25:75 blend of bis-(2,6-dimethoxybenzoyl)-2,4,4-trimethylpentyl phosphine oxide and 2-hydroxy-2-methyl-1-phenylpropan-1-one (IRGACURE™ 1700), a 50:50 blend of hydroxycyclo-hexylphenylketone and benzophenone (IRGACURE™ 500), 50:50 blend of 2,4,6-trimethylbenzoyl-diphenyl-phosphineoxide and 2-hydroxy-2-methyl-1-phenyl-propan-1-one (DAROCUR™ 4265), bis acryl phosphine (IRGACURE™ 819) and phosphine oxide (IRGACURE™ 2100), all available from Ciba Corporation, Ardsley, N.Y. Other cleavage-type initiators include 2,4,6-trimethylbenzoyl-diphenylphosphine oxide (LUCIRIN™ TPO) from BASF Corporation and a 70:30 blend of oligo 2-hydroxy-2-methyl-[4-(1-methylvinyl)phenyl]propan-1-one and 2-hydroxy-2-methyl-1-phenylpropan-1-one (KIP™ 100) available from Sartomer (Exton, Pa.). Preferred cleavage-type photoinitiator's are hydroxycyclo-hexylphenylketone, 2-hydroxy-2-methyl-1-phenylpropan-1-one, benzophenone, 2,4,6-trimethylbenzoyl-diphenylphosphine oxide bis acryl phosphine and a 70:30 blend of 2-hydroxy-2-methyl-[4-(1-methylvinyl)phenyl]propan-1-one and 2-hydroxy-2-methyl-1-phenylpropan-1-one.

Non-limiting examples of hydrogen abstraction-type photoinitiators include benzophenone, substituted benzophenones (e.g., ESCACURE™ TZT of Fratelli-Lamberti) and other diaryl ketones such as xanthones, thioxanthones, Michler's ketone, benzil, quinones and substituted derivatives of all of the above. Camphorquinone is an example of a compound that may be used when one desires to cure a coating composition with visible light.

For coating compositions or systems having a water-dispersible polymer and an olefinic compound including a mixture of two or more of a (meth)acrylate, an allyl ether and a vinyl ether functional group, a combination of curing procedures can be used. For example, a coating composition having a water-dispersible polymer, a (meth)acrylate and a vinyl ether functional group typically may include an α-cleavage-type or hydrogen abstraction type photoinitiator for polymerization of the (meth)acrylate groups and a cationic-generating photoinitiator for polymerization of the vinyl ether groups.

If desired, the coating composition or system may also include a co-initiator or photoinitiator synergist. Non-limiting examples of co-initiators include (1) tertiary aliphatic amines such as methyl diethanol amine and triethanol amine; (2) aromatic amines such as amylparadimethylaminobenzoate, 2-n-butoxyethyl-4-(dimethylamino)benzoate, 2-(dimethylamino)ethylbenzoate, ethyl-4-(dimethylamino)benzoate and 2-ethylhexyl-4-(dimethylamino)benzoate; (3) (meth)acrylated amines such as EBECRYL™ 7100 and UVECRYL™ P104 and P115, all from UCB RadCure Specialties; and (4) amino-functional acrylate or methacrylate resin or oligomer blends such as EBECRYL™ 3600 or EBECRYL™ 3703, both from UCB RadCure Specialties. Combinations of the above four categories of co-initiators may also be used.

In the case of visible or UV radiation curing systems, the preferred amount of photoinitiator present in the coating systems can be from about 0.2 to about 15 wt. % of the non-volatile components. More preferably the photoinitiator can be from about 0.5 to about 10 wt, %, and most preferably the photoinitiator can be from about 0.75 to about 5 wt. % of the non-volatile components.

Other methods for curing the coating systems can be used in combination with methods described herein Such other curing methods include heat cure, chemical cure, anaerobic cure, moisture cure, oxidative cure, and the like. Such methods may require inclusion of a corresponding curing initiator or curing agent in the composition. For example, heat cure can be induced by peroxides, metal curing packages can induce an oxidative cure, or multifunctional amines (for example isophorone diamine) can effect a chemical crosslinking cure through Michael addition of amine groups onto acrylate reactive unsaturated groups. If these additional initiators are present in the coating system they typically make up about 0.1-12% by weight of the curable coating system. Means for effecting cures by such methods are known to those of skill in the art or can be determined using standard methods.

Other optional components for use in the coating systems herein are described in Koleske et al., Paint and Coatings Industry, April, 2003, pages 12-86. Typical performance enhancing additives that may be employed include surface active agents, pigments, colorants, dyes, surfactants, dispersants, defoamers, thickeners, heat stabilizers, leveling agents, coalescents, biocides, mildewcides, anti-cratering agents, curing indicators, plasticizers, fillers, sedimentation inhibitors, ultraviolet light absorbers, optical brighteners, and the like to modify properties.

The coating systems may also contain an optional coalescent and many coalescents are known in the art. The optional coalescent is preferably a low VOC coalescent such as is described in U.S. Pat. No. 6,762,230.

Compositions including a latex polymer will also include a secondary dispersing or emulsifying agent, such as a nonionic or anionic surfactant, as described above. In addition to dispersing or emulsifying the latex polymer particles in water, the secondary dispersing or emulsifying agent may also assist in combining an olefinic compound with the water-dispersible polymer and latex polymer.

Exemplary coating compositions that can be used in the coating systems are listed below This is not intended to be an exhaustive list of examples of aqueous based coating compositions. The examples include the following compositions:

A Olefinic compound and an optional initiator (e.g., a UV photoinitiator)
B1 Water-dispersible polymer (e.g., a polyurethane dispersion);
B2 Water-dispersible polymer and latex polymer;
B3 Water-dispersible polymer and water-soluble silicate salt;
B4 Water-dispersible polymer, latex polymer and water-soluble silicate salt;
B5 Latex polymer;
B6 Latex polymer and water-soluble silicate salt; and
C1-C6 The above compositions B1-B6 further comprising one or more olefinic compounds and an optional initiator (e.g., a UV photoinitiator).

Composition A—An example of a coating composition for use in the coating system includes one or more olefinic compounds and an optional initiator. Monomeric and oligomeric olefinic compounds are preferred with monomeric olefinic compounds being most preferred. An exemplary preferred monomeric olefinic compound is trimethylolpropane triacrylate (TMPTA) (available from Sartomer). An exemplary preferred initiator is 2-hydroxy-2-methyl-1-phenylpropan-1-one (DAROCUR™ 1173, available from Ciba).

Composition B1—Another example of a coating composition for use in the coating system includes a water-dispersible polymer (e.g., a polyurethane dispersion such as EPS 4208 (available from EPS) or LUX 399 (available from Alberdink Boley)).

Composition B2—Another example of a coating composition for use in the coating system includes an aqueous mixture of (i) water-dispersible polymer (e.g., those used in Composition B1); and (ii) latex polymer (e.g., EPS 2505, EPS 2502, EPS 2520 or EPS 2568 latex polymer; available from EPS) or AIRFLEX EF811 (available from Air Products) or ROSHIELD 3120 (available from Rohm & Haas) or NEO-CAR 2535 latex polymer (available from Dow) or the polymers described in the above-mentioned U.S. Patent Application Nos. US 2006/0135684 A1, US 2006/0135686 A1 and US 2007/0110981 A1.

Composition B3—Another example of a coating composition for use in the coating system includes an aqueous mixture of (i) water-dispersible polymer (e.g., those used in Composition B1); and (ii) a water-soluble silicate salt such as described above (e g., potassium silicate).

Composition B4—Another example of a coating composition for use in the coating system includes an aqueous mixture of (i) water-dispersible polymer (e.g., those used in Composition B1); (ii) latex polymer (e.g., those used in Composition B2); and (iii) a water-soluble silicate salt (e g., potassium silicate).

Composition B5—Another example of a coating composition for use in the coating system includes a latex polymer (e.g., those used in Composition B2).

Composition B6—Another example of a coating composition for use in the coating system includes an aqueous mixture of (i) latex polymer (e.g., those used in Composition B2) and (ii) a water-soluble silicate salt (e.g., potassium silicate).

Compositions C1 to C6—The aforementioned exemplary coating compositions B1 to B6 respectively further comprising one or more olefinic compounds and an optional initiator (e.g., those used in Composition A).

The coating system can be applied as multiple applications of more than one coating composition which collectively contain at least one water-dispersible polymer and at least one olefinic compound, or as a single application of a coating composition containing at least one water-dispersible polymer and at least one olefinic compound. Application of a coating composition containing at least one olefinic compound followed by application of a coating composition containing at least one water-dispersible polymer is preferred. Other modes or orders of application of the selected coating compositions can be readily determined by a person skilled in the art. Exemplary descriptions of several coating systems are provided below.

An example of a coating system that may be used to prepare a coated article includes a water-dispersible polymer, one or more olefinic monomers and an optional initiator. This system includes the application of coating composition B1 to the article, followed by or preceded by application of coating composition A to the article.

Another example of a coating system that may be used to prepare a coated article includes a water-dispersible polymer, one or more olefinic oligomers and an optional initiator. This system includes the application of coating composition B1 to the article, followed or preceded by application of coating composition C1 to the article.

Another example of a coating system that may be used to prepare a coated article includes a water-dispersible polymer, one or more olefinic monomers and an optional initiator. This system includes the application of coating composition C1 to the article.

Another example of a coating system that may be used to prepare a coated article includes a water-dispersible polymer, a latex polymer, one or more olefinic monomers and an optional initiator. This system includes the application of coating composition B1 to the article, followed by or preceded by application of coating composition C2 to the article.

Another example of a coating system that may be used to prepare a coated article includes a water-dispersible polymer, a latex polymer, one or more olefinic monomers and an optional initiator. This system includes the application of coating composition B1 to the article, followed or preceded by application of coating composition C5 to the article.

Another example of a coating system that may be used to prepare a coated article includes a water-dispersible polymer, a latex polymer, one or more olefinic monomers and an optional initiator. This system includes the application of coating composition B2 to the article, followed or preceded by application of coating composition C2 to the article.

Another example of a coating system that may be used to prepare a coated article includes a water-dispersible polymer, one or more olefinic monomers, a water-soluble silicate salt and an optional initiator. This system includes the application of coating composition C3 to the article.

Another example of a coating system that may be used to prepare a coated article includes a water-dispersible polymer, a latex polymer, one or more olefinic oligomers, a water-soluble silicate salt and an optional initiator. This system includes the application of coating composition C2 to the article, followed or preceded by application of coating composition B3 to the article.

Another example of a coating system that may be used to prepare a coated article includes a water-dispersible polymer, one or more olefinic monomers, a water-soluble silicate salt and an optional initiator. This system includes the application of coating composition B3 to the article, followed or preceded by application of coating composition C3 to the article.

Other variations will be apparent to persons having ordinary skill in the art.

A variety of application routes may be employed for preparing the coated articles. Specific Application Routes Include:

Apply a coating composition, dry to remove at least a portion of the water and subject the coating system to a radiation cure (e.g., electron beam or UV cure);

Apply a coating composition, apply one or more additional coating composition(s), dry to remove at least a portion of the water and subject the coating system to radiation cure (e.g., electron beam or UV cure); and Apply a coating composition and dry to remove at least a portion of the water, apply one or more additional coating composition(s), dry to remove at least a portion of the water and subject the coating system to radiation cure (e.g., electron beam or UV cure).

Accordingly, the articles can be prepared by applying the coating system as a single coating composition or the coating system can be applied as multiple compositions. In coating systems using multiple coating compositions, (i) the applied coating composition(s) can be dried (to remove at least a portion of the water) prior to curing or addition of one or more additional coating compositions, or (ii) the coating composition(s) can be applied prior to drying the previously applied coating composition(s), thus allowing the coating compositions to mix at an interface.

The disclosed aqueous coating composition(s) are preferably applied at about 5 to 50% solids by weight and more preferably at about 10 to 40% solids. Preferred coating composition(s) contain less than 5% volatile organic compounds based on the total composition weight, more preferably less than 0.5%.

The coating systems may be applied by any number of application techniques including but not limited to brushing (e.g., using a brush coater), direct roll coating, reverse roll coating, flood coating, vacuum coating, curtain coating and spraying. The various techniques each offer a unique set of advantages and disadvantages depending upon the substrate profile, morphology and tolerable application efficiencies. Lower viscosities facilitate uniform film control. The applied film thickness may be controlled for example by varying the application rate.

The disclosed coating systems may for example be applied to a cement fiberboard substrate by roll coating. A dry film thickness (DFT) of the coating system on the cement fiberboard substrate may for example be in the range of, but not limited to, about 0.2 to about 4 mil (about 0.005 to about 0.1 mm), more preferably about 0.3 to about 3 mil (about 0.008 to about 0.08 mm).

It is preferred that the coated articles are coated on at least one major surface with the coating system. More preferably, the coated articles are coated on a major surface and up to four minor surfaces including any edges. Most preferably, the coated articles are coated on all (e.g., both) major surfaces, and up to four minor surfaces including any edges.

A topcoat may be applied directly to the coating system. The coating systems and coating compositions described herein may be used in place of or in addition to coatings that the prior art has categorized as "sealers," "primers" and "topcoats." However, the systems and compositions may not fit neatly into any category per se and such terms should not be limiting.

The invention will be described by the following non-limiting examples.

EXAMPLES

List of Ingredients:
DAROCUR 1173—2-Hydroxy-2-methyl-1-phenylpropan-1-one (Ciba, Ardsley, N.Y.)
DiTMPTA—Trimethylolpropane triacrylate (Sartomer, Exton, Pa.)
EPS 2505—A styrene acrylic latex (Engineered Polymer Solutions, Marengo, Ill.)
FOAMMASTER™ 111—(Cognis Cincinnati, Ohio)
LUX 399—A (meth)acrylate modified polyurethane (Alberdink Boley, Greensboro, N.C.)

Examples 1a and 2b

Radiation-Curable Composition with Polyurethane Dispersion, Latex Polymer and Olefin Example 1a In a mixing vessel the following components are added under agitation:

| | |
|---|---|
| DAROCUR 1173 | 1.5 grams |
| DiTMPTA | 7 grams |

In a second mixing vessel, the mixture above is then added under agitation to a mixture of:

| | |
|---|---|
| LUX 399 | 87.5 grams |
| Deionized water | 281 grams |
| EPS 2505 | 27 grams |
| FOAMMASTER 111 | 0.25 grams |

After mixing for 30 minutes, the coating system is allowed to de-air. The coating system is then applied to a fiber cement article at a dry film thickness of 0.5 to 0.7 mils, and a portion of the water is removed, either by air drying, a heated drying stage or by application to a warm substrate (~38° C.). The resulting mixture will cure upon exposure to ultraviolet light. Application of a topcoat as described in the above-mentioned U.S. Patent Application Nos. US 2006/0135684 A1, US 2006/0135686 A1 and US 2007/0110981 A1 should provide an improved freeze thaw and wet adhesion coating system for fiber cement.

Example 1b

The above procedure may be repeated, but without using the photoinitiator. The resulting mixture should cure upon exposure to electron beam radiation, and application of a topcoat as described in the above-mentioned U.S. Patent Application Nos. US 2006/0135684 A1, US 2006/0135686 A1 and US 2007/0110981 A1 should provide an improved freeze thaw and wet adhesion coating system for fiber cement.

It is also noted that the disclosed coating systems and coating compositions can be used with other coating compositions such as those disclosed in the following applications: U.S. Provisional Application Ser. Nos. 60/764,044, 60/764,131 and 60/764,242 (each filed Jan. 31, 2006) and 60/802,185 filed May 19, 2006.

All patents, patent applications and literature cited in the specification are hereby incorporated by reference in their entirety. In the case of any inconsistencies, the present disclosure, including any definitions therein will prevail. The invention has been described with reference to various specific and preferred embodiments and techniques. However, it should be understood that many variations and modifications may be made while remaining within the invention.

What is claimed is:
1. A coated article, comprising:
a cement fiberboard substrate; and
a radiation-curable coating system applied to the substrate;
wherein the coating system comprises:
an aqueous dispersion of water-dispersible polymer particles that are functionalized so that the water-dispersible polymer of such particles can participate in radiation curing; and
about 2 to about 50% by weight, based on the total weight of nonvolatile components in the coating system, of one or more olefinic compounds; and
wherein the coating system includes one or more coating compositions that may be applied in one or more layers.
2. The article of claim 1, wherein the coating system further comprises a UV photoinitiator system.

3. The article of claim 1, wherein the water-dispersible polymer comprises a polyurethane.

4. The article of claim 1, wherein the coating system further comprises a latex polymer.

5. The article of claim 1, wherein the coating system comprises a first composition that includes one or more olefinic compounds and a second composition that includes a water-dispersible polymer and water and wherein the coating system is cured using radiation.

6. The article of claim 5, wherein the one or more olefinic compounds comprise a (meth)acrylate, vinyl, vinyl ether, allyl ether, vinyl ester, unsaturated oil, unsaturated fatty acid, or combination thereof.

7. The article of claim 6, wherein the one or more olefinic compounds comprise isobornyl (meth)acrylate, isodecyl (meth)acrylate, phenoxyethyl (meth)acrylate, trimethylolpropane tri(meth)acrylate, alkoxylated cyclohexane dimethanol di(meth)acrylate, trimethylolpropane ethoxylate tri (meth)acrylate, dipropylene glycol di(meth)acrylate, tripropylene glycol di(meth)acrylate, hexanediol di(meth) acrylate, tetrahydrofurfuryl (meth)acrylate, pentaerythritol tri(meth)acrylate, pentaerythritol tetra(meth)acrylate, ditrimethylolpropane tetra(meth)acrylate, propoxylated glycerol tri (meth)acrylate, beta-carboxyethyl (meth)acrylate, bisphenol A ethoxylate di(meth)acrylate, ethoxylated neopentyl glycol di(meth)acrylate, propoxylated neopentyl glycol di(meth) acrylate, or combination thereof.

8. The article of claim 7, wherein the one or more olefinic compounds comprise trimethylolpropane tri(meth)acrylate, bisphenol A ethoxylate di(meth)acrylate, propoxylated glycerol tri(meth)acrylate, trimethylolpropane ethoxylate tri (meth)acrylate, ditrimethylolpropane tetra(meth)acrylate or combination thereof.

9. The article of claim 5, wherein the one or more olefinic compounds comprise a monomer.

10. The article of claim 5, wherein the one or more olefinic compounds comprise an oligomer.

11. The article of claim 1, wherein at least one of the coating compositions is UV curable.

12. The article of claim 1, wherein the water-dispersible polymer is radiation curable.

13. The article of claim 1, wherein the coating system further comprises a water-soluble silicate salt.

14. The article of claim 13, wherein the water-soluble silicate salt comprises potassium silicate.

15. The article of claim 1, wherein a topcoat is applied over the coating system.

16. The article of claim 1, wherein the cement fiberboard substrate is in the form of a siding product.

17. The article of claim 1, wherein the coated article when radiation cured can withstand at least 30 freeze-thaw cycles.

18. The article of claim 17, wherein the coated article can withstand at least 75 freeze-thaw cycles.

19. The article of claim 18, wherein the coated article can withstand at least 175 freeze-thaw cycles.

20. The article of claim 1, wherein the coating system has a VOC of less than about 5% based on the total weight of the coating system.

21. The article of claim 1, wherein the coating system has a VOC of less than about 2% based on the total weight of the coating system.

22. The article of claim 1, wherein the coating system has a VOC of less than about 0.5% based on the total weight of the coating system.

23. The article of claim 1, wherein the water-dispersible polymer is functionalized with olefinic groups.

24. The article of claim 1, wherein the water-dispersible polymer is functionalized with auto-oxidative carbon-carbon double bonds.

25. The article of claim 1, wherein the coating system contains 10 to 35% by weight olefinic compounds, based on the total weight of nonvolatile components in the coating system.

26. A method for making a coated article, which method comprises:
    providing a cement fiberboard substrate;
    coating at least a portion of the substrate with a radiation-curable coating system of claim 1; and
    radiation-curing the coating.

27. A method according to claim 26 comprising coating the substrate with a first coating composition comprising the one or more olefinic compounds followed by a second coating composition comprising the aqueous dispersion of polymer particles.

28. A coated article prepared according to the method of claim 26.

29. A coated article, comprising:
    a cement fiberboard substrate; and
    a radiation-curable coating system applied to the substrate;
    wherein the coating system comprises a polyurethane dispersion of polymer particles that are functionalized so that the polyurethane can participate in radiation curing and at least 2% by weight, based on the total weight of nonvolatile components in the coating system, of one or more olefinic compounds, the coating system includes one or more coating compositions that may be applied in one or more layers, and at least one of the one or more coating compositions is an aqueous composition.

30. The article of claim 29, wherein the coating system contains 10 to 35% by weight olefinic compounds, based on the total weight of nonvolatile components in the coating system.

* * * * *